United States Patent [19]

Fahmuller

[11] Patent Number: 5,018,677
[45] Date of Patent: May 28, 1991

[54] WINDING DEVICE TO WIND UP YARN IN SPINNING OR WINDING MACHINES

[75] Inventor: Maximilian Fahmuller, Kelheim, Fed. Rep. of Germany

[73] Assignee: Schubert & Salzer Maschinenfabrik Aktiengesellschaft, Ingolstadt, Fed. Rep. of Germany

[21] Appl. No.: 467,051

[22] Filed: Jan. 18, 1990

[30] Foreign Application Priority Data

Jan. 20, 1989 [DE] Fed. Rep. of Germany ....... 3901631

[51] Int. Cl.$^5$ ..................... B65H 54/42; B65H 54/52
[52] U.S. Cl. ............................ 242/18 DD; 242/129.51
[58] Field of Search .......... 242/18 DD, 18 R, 129.51, 242/65, 66

[56] References Cited

U.S. PATENT DOCUMENTS

| | | | |
|---|---|---|---|
| 2,651,479 | 9/1953 | Bauer | 242/129.51 |
| 3,181,804 | 5/1965 | Mullers et al. | 242/18 DD |
| 3,338,528 | 8/1967 | Eppendahl | 242/129.51 |
| 3,575,356 | 4/1971 | Campbell, Jr. | 242/18 DD |
| 3,861,606 | 1/1975 | Loguineau et al. | 242/18 DD |
| 3,940,074 | 2/1976 | Laski et al. | 242/18 DD |
| 4,022,390 | 5/1977 | Matas-Gabalda | 242/18 DD |
| 4,342,429 | 8/1982 | Katoh et al. | 242/18 DD |
| 4,572,449 | 2/1986 | Naylor | 242/18 DD |
| 4,718,615 | 1/1988 | Hefti et al. | 242/18 DD |

FOREIGN PATENT DOCUMENTS

| | | |
|---|---|---|
| 2217295 | 12/1972 | Fed. Rep. of Germany ........ 242/18 DD |
| 2218520 | 1/1973 | Fed. Rep. of Germany ........ 242/18 DD |
| 3002035 | 7/1980 | Fed. Rep. of Germany ........ 242/18 DD |
| 3005327 | 8/1980 | Fed. Rep. of Germany . |
| 3433082 | 4/1985 | Fed. Rep. of Germany . |

Primary Examiner—Stanley N. Gilreath
Attorney, Agent, or Firm—Dority & Manning

[57] ABSTRACT

The instant invention relates to a winding device with a damping mechanism to prevent oscillations of the yarn body during winding. A bobbin support arm of the winding device is, for that purpose, equipped with a damping device which is made in form of an oscillating system. The oscillating system may comprise the actuating lever for the bobbin arm, for example. The oscillating weight executes oscillations in a plane perpendicular to the bobbin axis. The oscillating weight may be mounted elastically or dampingly on the bobbin arm.

15 Claims, 4 Drawing Sheets

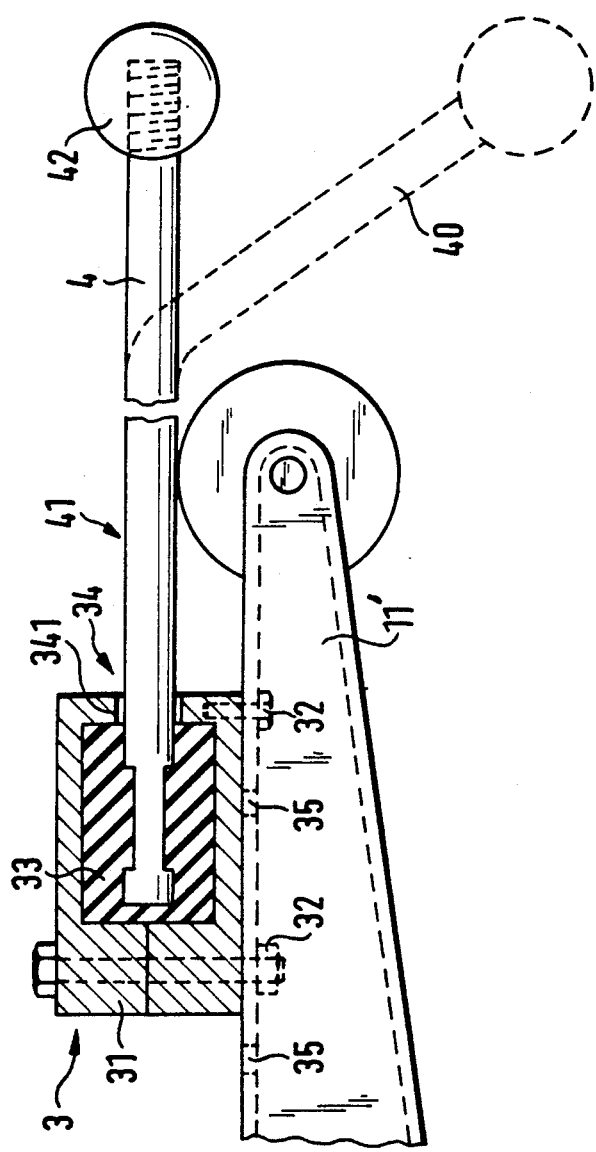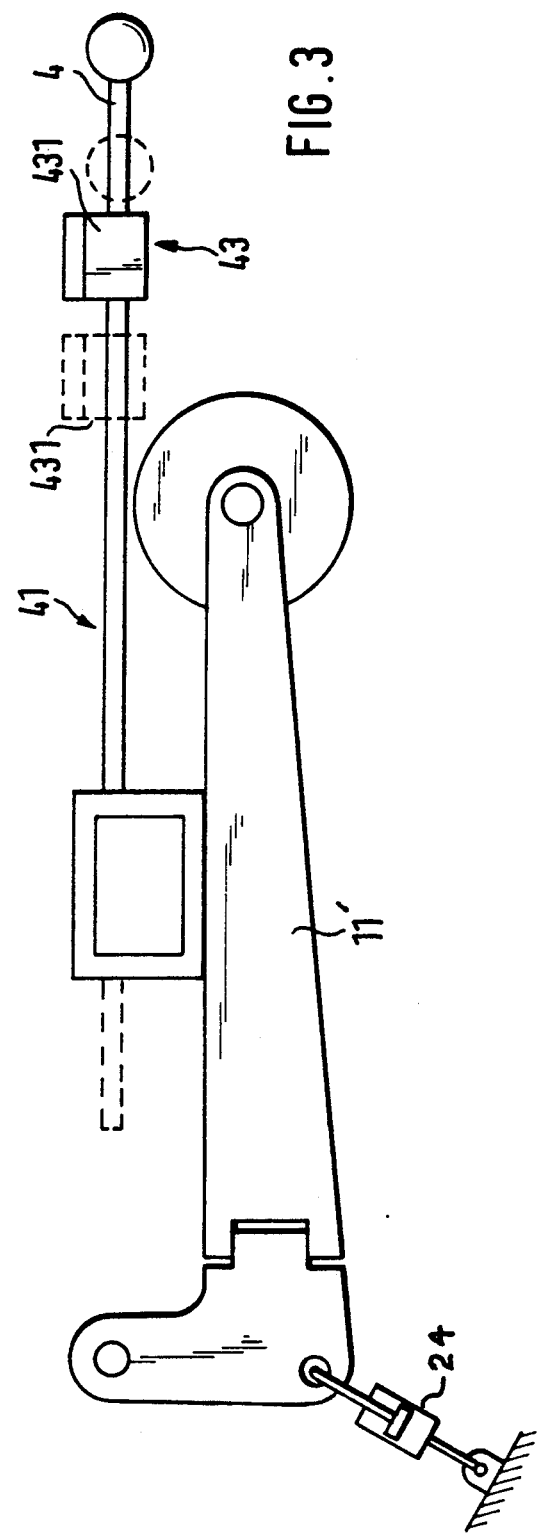

5,018,677

WINDING DEVICE TO WIND UP YARN IN SPINNING OR WINDING MACHINES

BACKGROUND OF THE INVENTION

The instant invention relates to a winding device for winding yarn on spinning and winding machines.

When yarn is wound up on formers held by bobbin arms, oscillations transversely to the bobbin's axis of rotation occur, especially at high delivery speeds and high rotational speed of the bobbins. These oscillations cause the bobbin to run erratically, resulting in irregularities in bobbin build-up which are detrimental to further winding and to further processing of the yarn on the bobbin.

DE-OS 34 33 082 discloses a device for the reception of yarn bodies which is equipped with oscillation dampers to dampen oscillations of the yarn bobbin during winding. Each of these dampers consists of a friction block which dampens oscillations of the cradle arm through friction applied to the support arm. This has the disadvantage that additional means are needed, laterally, next to the bobbin arms of the winding device, against which the friction elements can attack. This involves great space requirements and construction effort for the winding device. A further disadvantage is the fact that damping is effected in both directions of the oscillation. This leads to the danger that bobbins, especially light ones, may be lifted off their drive rollers.

DE-OS 30 05 327 features a damper functioning hydraulically which is attached on one side to the bobbin arm end, away from the bobbin, and on the other side to the spinning machine. Oscillating movements of the bobbin are to be dampened by it. With this arrangement, only slight path changes of the oscillating bobbin arm are available for transmission to the damper. It is, thus, not possible to dampen the oscillations effectively, especially when high rotational speeds of the bobbin are involved. Placing the dampers near the bobbin would result in greater oscillation paths, but this would involve a great construction effort and great space requirements for the individual winding stations.

SUMMARY OF THE INVENTION

It is the object of the instant invention to provide a winding device that has effective damping of the bobbin during the winding process may be achieved by simple means.

The object is attained by the invention by providing a dampener weight on at least one of the bobbin support arms to counteract vertical oscillations of the bobbin towards and away from the bobbin driving roller. Additional advantageous embodiments of the invention are described in the sub-claims.

BRIEF DESCRIPTION OF THE DRAWINGS

The invention is described with respect to the attached drawings in which:

FIG. 2 is a cross-sectional view of a damping device;

FIG. 3 is a side view of a bobbin arm with an actuating lever on which an additional part is mounted to shift the center of gravity;

DETAILED DESCRIPTION OF THE INVENTION

Figure 1:
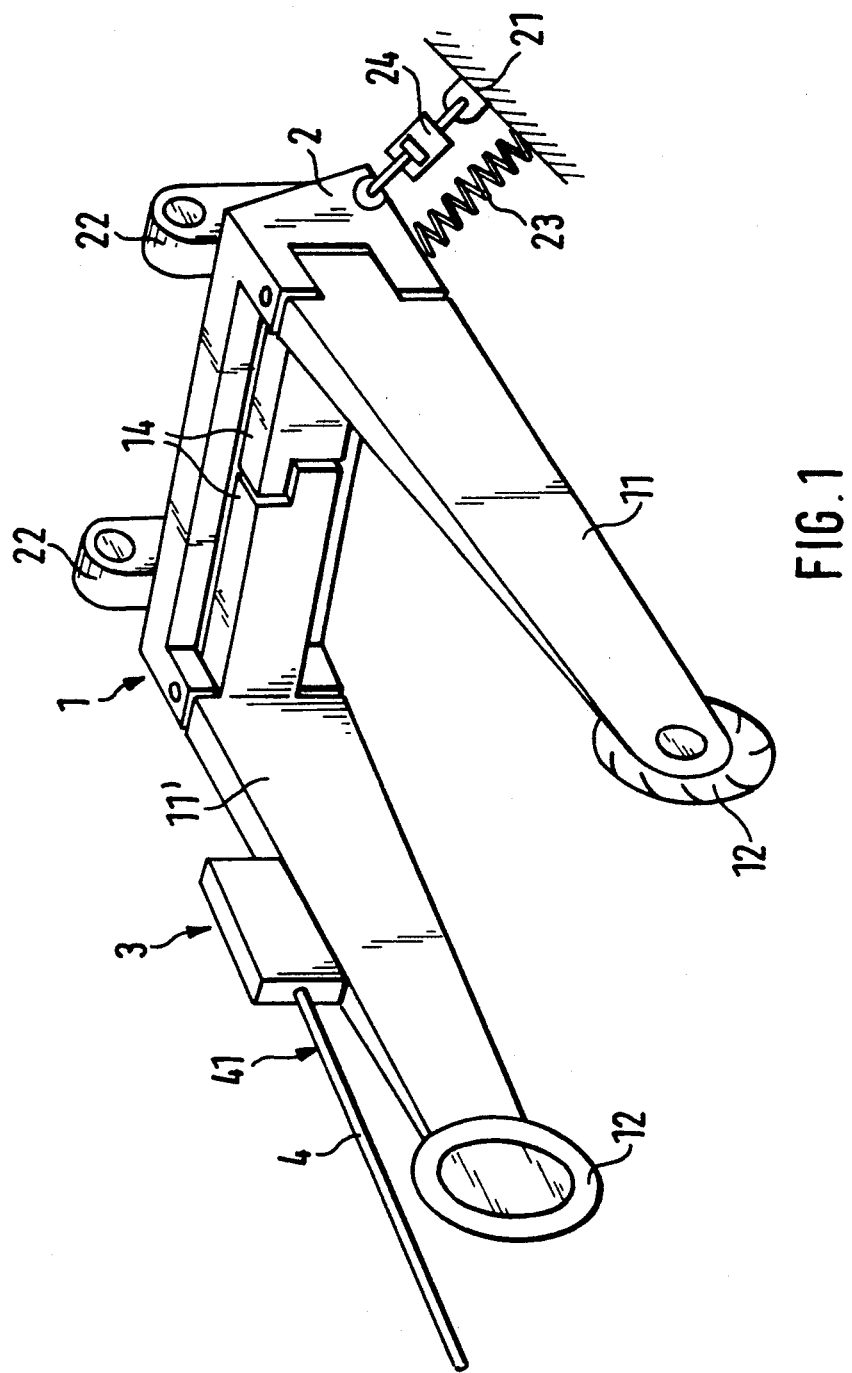
FIG. 1 is a perspective view of a winding device according to the invention.

FIG. 1 shows a winding device 1 in perspective which comprises a basic body 2 with two bobbin arms 11, 11', each with a bobbin plate 12 to receive a bobbin former. The basic body 2 is mounted pivotably on the machine frame 21 by means of a hinge 22. The two bobbin arms 11, 11' are connected to each other by a connecting means 14. The basic body 2 is connected by a spring element 23 and a damper 24 to the machine frame 21. The spring element 23 serves to fix the winding device in one of its two positions. In one position, the bobbin is laid on the friction roller, in the other position, the bobbin is lifted away from it. The damper 24 serves to dampen rough impacts and shocks of the bobbin during winding and also to deposit it softly on the friction roller.

A damping device 3 is mounted on the bobbin arm 11'. The actuating lever 4, which at the same time serves as an oscillating weight 41, and, together with an elastic element, constitutes an oscillating system, is thereby also part of the damping device 3. The actuating arm 4 has several functions. It serves to lift the bobbin away from a friction roller which drives it, whereby the bobbin arms pivot transversely to the axis of the bobbin former (not shown) and around the hinge 22. Actuation of the lever 4, in the direction of the bobbin axis away from the bobbin causes the two bobbin arms 11, 11' to be moved apart, causing a bobbin former held between the bobbin plates 12 to be released. According to the instant invention, the actuating lever 4 serves at the same time as an oscillating weight 41. The oscillating weight 41 executes oscillation in the same plane as the bobbin arm. This plane is perpendicular to the rotational axis of the bobbin. The bobbin arm 11' and the actuating lever 4 are elastically and dampingly connected to each other via the damping device 3. These functions can be carried out simultaneously by means of rubber-like materials as seen in FIG. 2.

FIG. 2 shows a device according to the invention, with an oscillating weight 41 in form of an actuating lever 4, and with the damping device 3, shown in cross-section. The damping device 3, furthermore, consists of a two-part housing 31 which is attached on the bobbin arm 11' by attachment means 32. The interior of the housing 31 contains a rubber block 33 which is divided at a plane parallel to the plane of the bobbin arm 11', with the rubber block 33 holding the actuating lever 4 in recesses on either side of the divisional plane. The actuating lever can also be incorporated into the rubber block during molding or can be bonded to it. Actuating lever 4 and rubber block 33 have profiles designed so that the actuating lever 4 is fixed in the axial direction. By a profile in the radial direction, for example, an angled actuating lever 40 is also secured against twisting.

At the location 34, at which the actuating lever 4 emerges from the housing 31, which housing has the configuration of two clamping jaws, there is sufficient room between housing 31 and actuating lever 4 so that the actuating lever 4 does not impact against the housing if it oscillates as a result of shock or oscillating movements of the winding device 1. When the bobbin arms are opened to insert or remove a former or bobbin, the actuating lever is pressed against the wall of the housing 31 at location 34, in case that an appropriate force is necessary for this. The wall thereby constitutes a stop 341 which limits the mobility of the lever 4 to the extent required for covibration. If the actuating lever 4 is actuated by an automatic service unit, a fixed stop is required. The possible mobility of the actuating arm can be extensively limited, especially in the direction of movement parallel to the bobbin axle, since the oscillations needed for damping occur mostly vertically.

The mass of the actuating lever 4 and its center of gravity can be changed by means of the manual knob 42. For this purpose a manual knob 42 with a different mass is screwed on. Axial shifting, e.g. resulting from further installation or removal of the manual knob 42 can also change the position of the center of gravity for lever 4.

FIG. 3 shows a side view of a device according to FIGS. 1 and 2 in which an additional part 43 is placed on the actuating lever 4. It is mounted on the actuating lever in a movable manner and is held in its assigned position by means of a clamping device (not shown). By adding the additional weights 431 to the additional part 43, as well as by changing the position of the additional part 43, its mass and thereby its ability to act upon the oscillating attitude of the damping device 3 can be changed as with the manual knob 42.

An adjustability of the oscillation attitude of the damping device 3 can also be achieved in that the length of the actuating lever 4 can be changed. This can be achieved, for example, if the actuating lever 4 can be shifted within the damping device 3 (FIG. 3) to extend through the elastic block, as shown by the dotted-line position.

A further possibility for the oscillating weight 41 to act upon the oscillation attitude of the winding device is afforded by the position of the damping device 3. Due to the fact that additional fixing positions 35 are provided (FIG. 2), the position of the damping device on the bobbin arm 11' can be changed. If the additional fixing positions 35 are made in the form of oblong perforations or slots, the position can be adjusted infinitely.

Figure 4:
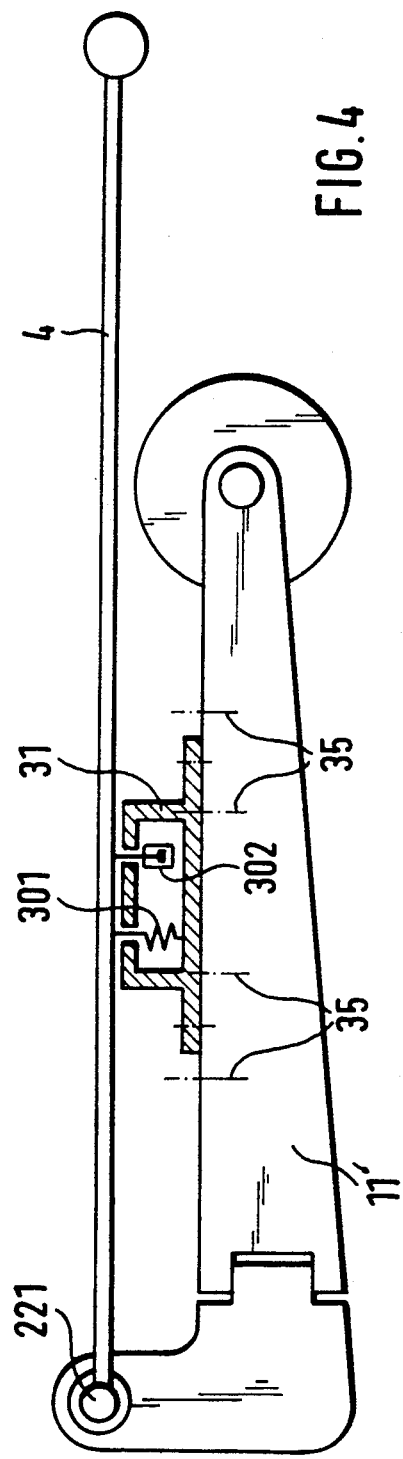
FIG. 4 is a side view of a bobbin arm with an actuating lever which is located within the center of gravity of the bobbin former holder.

FIG. 4 shows a bobbin arm 11' with an actuating arm 4 which can be pivoted at pivot 221 in the pivoting plane of the winding device 1 and which is attached to the axis of the winding device 1. The actuating arm 4 is supported on the bobbin arm 11'. In this, it can bear individually upon an elastic element (301), e.g. in form of a spring, and upon a damping element (302), e.g. in form of a hydraulic damper.

The damping device 3 contains a spring as the elastic element 301 and a hydraulic damper as the damping element 302, both of which are located in a housing 31, which is in turn attached to the bobbin arm by attachment means. The housing 31 can be shifted on the bobbin arm and can be fixed in other positions. For this, additional fixing positions 35 are provided in the bobbin arm 11', so that the damping attitude of the damping device 3 can be adjusted.

Figure 5:
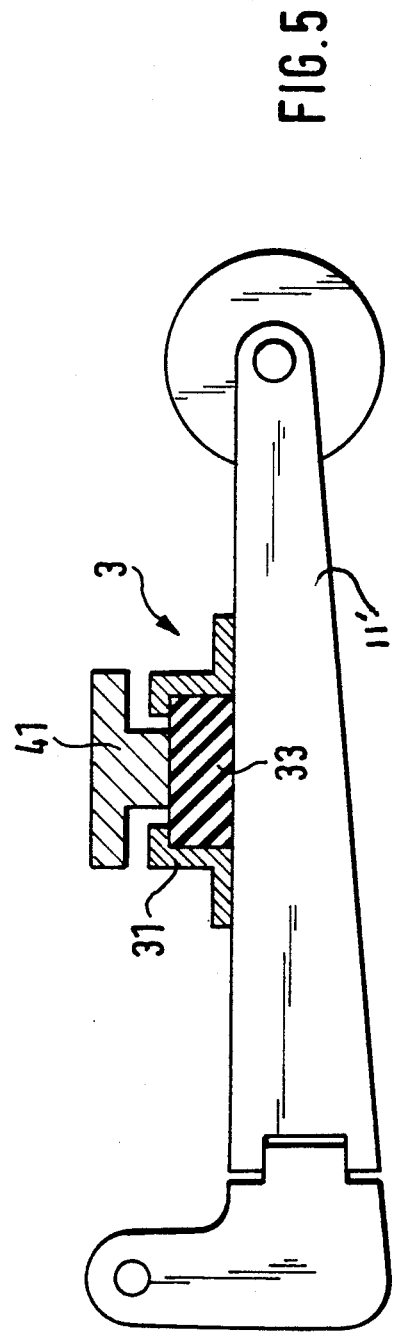
FIG. 5 is a side view of a bobbin arm with a rubber block.

FIG. 5 shows a simple embodiment of the device according to the invention, in which a damping device 3 together with a housing 31 and a rubber block 33 is mounted on the bobbin arm 11'. The housing 31 is made in form of a socket enclosing the elastic block 33, a rubber block 33 in this case, and attaching it to the bobbin arm 11'. An oscillating weight 41 is connected to the rubber bock 33. The oscillations of the bobbin arm 11' and of the overall winding device 1 are transmitted via a damping and an oscillating element, represented simultaneously by the rubber block 33, to the oscillating weight 41. The latter is made in form of a simple metal block which is connected to the rubber block 33 by such means as vulcanization, for example.

Figure 6:
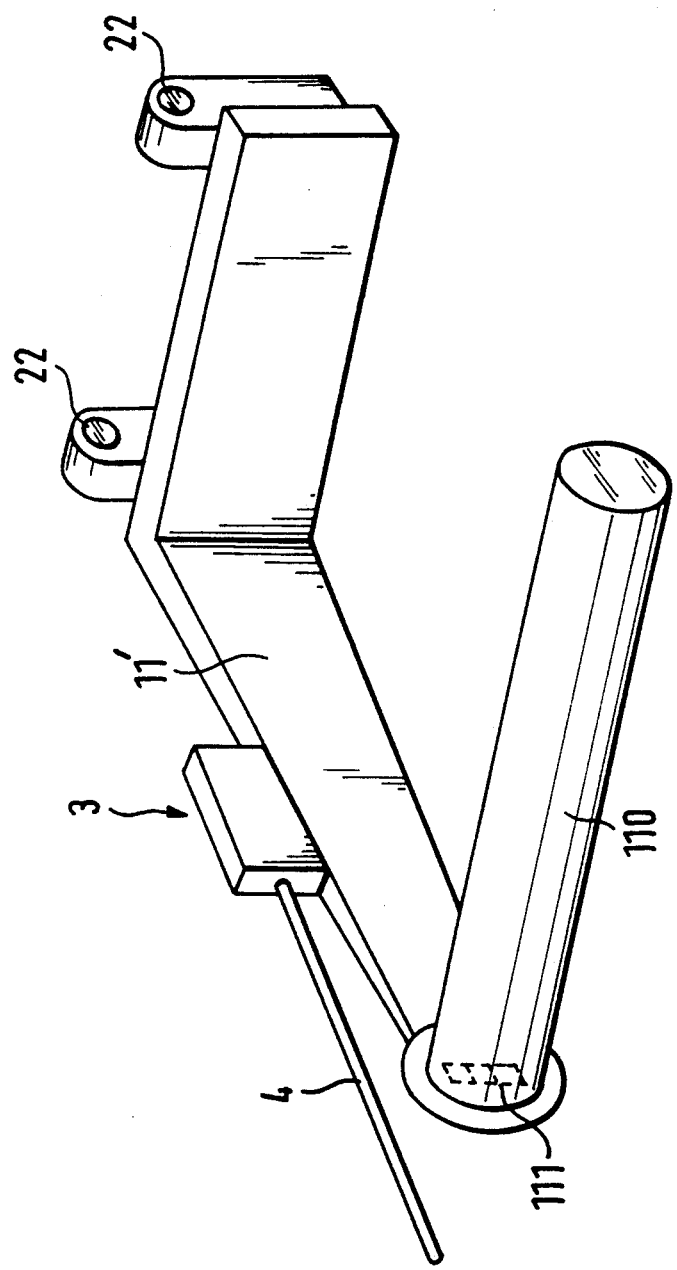
FIG. 6 is a perspective view of a winding device with only one bobbin arm.

FIG. 6 shows a winding device similar to FIG. 1, with only one bobbin arm 11'. On the latter, a mandril 110 is mounted, on which the former is pushed. To facilitate the installation of the empty former and the removal of the yarn bobbin, the mandril 110 is capable of rotating by joint 111 in relation to the bobbin arm 11'. A damping device 3 is provided on the bobbin arm 11'. As in the other embodiments, the bobbin arm 11' can be pivoted by means of lever 4 by the hinges 22, so that a former or tube pushed over the mandril 110 can be set upon a friction roller, which drives it, and can be lifted away from it. Oscillation of the bobbin, transversely to its direction of rotation, are damped by the damping device 3.

In a simple embodiment in which only a certain known oscillation is to be neutralized, the damping element 24 can be dispensed with if the pivoting element, e.g. a spring, together with the oscillating weight 41, is precisely adapted to the known oscillations acting upon the winding device.

It is, of course, possible to provide several damping devices on a winding device, e.g. one per bobbin arm, and these can be adapted to different frequencies through different placements of their springs and masses.

I claim:

1. A winding device for winding yarn onto bobbins, comprising:
   a) a bobbin for receiving yarn;
   b) a bobbin for support arm for supporting said bobbin for rotation;
   c) contact drive means for rotating said bobbin for winding said yarn thereon;
   d) a hinge for connecting said bobbin support arm to a frame member for permitting said bobbin arm and said bobbin to move towards and away from said contact drive means;
   e) resilient means for urging said bobbin into contact with said contact drive means; and
   f) dampening means disposed on said bobbin support arm for counteracting and damping oscillating movements of said bobbin support arm and said bobbins in a plane transverse to the longitudinal axis of said bobbin.

2. A winding device as set forth in claim 1, wherein said dampening means comprises an actuating lever.

3. A winding device as set forth in claim 2, wherein said actuating lever is resiliently mounted on said bobbin support arm by an elastic element.

4. A winding device as set forth in claim 3, wherein said actuating lever has a free end with a weight affixed thereto.

5. A winding device as set forth in claim 4, wherein said actuating lever is resiliently supported parallel to said bobbin support arm.

6. A winding device as set forth in claim 4, wherein an additional weight is disposed on said actuating lever.

7. A winding device as set forth in claim 6, wherein the position of said additional weight on said actuating lever is adjustable.

8. A winding device as set forth in claim 4, including means for displaceably mounting said actuating lever on said bobbin support arm.

9. A winding device as set forth in claim 4, comprising a pair of openable bobbin support arms and at least one stop disposed against said actuating lever when said bobbin support arms are open.

10. A winding device as set forth in claim 3, wherein said actuating lever supports an oscillating weight on its free end and its other end is clamped elastically in a clamp attached to said bobbin arm.

11. A winding device as set forth in claim 10, wherein said clamp has two jaws and one end of said actuating lever is embedded in a block of rubber held within said clamp.

12. A winding device as set forth in claim 10, wherein said actuating lever is interlocked with said elastic element.

13. A winding device as set forth in claim 1, wherein said resilient means comprises a rubber material which is held in a socket and is attached to said bobbin support arm.

14. A winding device as set forth in claim 1, wherein a second dampener connects said bobbin arm to a frame member on said winding device.

15. A winding device as set forth in claim 1, including means for adjustable mounting said dampening means on said bobbin support arm.

* * * * *